US007945493B2

(12) United States Patent
Foster et al.

(10) Patent No.: US 7,945,493 B2
(45) Date of Patent: May 17, 2011

(54) CREATION OF PSEUDO BLOCK TO ASSIST IN SYSTEM FOR FACILITATING TRADE PROCESSING AND TRADE MANAGEMENT

(75) Inventors: Gary S. Foster, Arlington, MA (US); Jeffrey C. Addis, Marblehead, MA (US); Andy Luro, Princeton, MA (US); Matthew Snow, Boston, MA (US)

(73) Assignee: Omgeo LLC, Boston, MA (US)

( * ) Notice: Subject to any disclaimer, the term of this patent is extended or adjusted under 35 U.S.C. 154(b) by 2161 days.

(21) Appl. No.: 09/931,123

(22) Filed: Aug. 16, 2001

(65) Prior Publication Data
US 2002/0004777 A1   Jan. 10, 2002

Related U.S. Application Data

(63) Continuation-in-part of application No. 09/504,803, filed on Feb. 16, 2000.

(51) Int. Cl.
*G06Q 40/00* (2006.01)
(52) U.S. Cl. ............. 705/35; 705/36 R; 705/37; 705/38; 705/39; 705/40; 705/41; 705/42; 235/380
(58) Field of Classification Search .............. 705/35–42; 235/380
See application file for complete search history.

(56) References Cited

U.S. PATENT DOCUMENTS

| | | | |
|---|---|---|---|
| 3,573,747 A * | 4/1971 | Adams et al. .............. 340/172.5 |
| 4,346,442 A | 8/1982 | Musmanno | |
| 4,376,978 A | 3/1983 | Musmanno | |
| 4,571,463 A | 2/1986 | Shefler | |
| 4,674,044 A | 6/1987 | Kalmus et al. | |
| 4,694,397 A | 9/1987 | Grant et al. | |
| 4,774,663 A | 9/1988 | Musmanno et al. | |
| 4,823,265 A * | 4/1989 | Nelson .......................... 364/408 |
| 4,949,248 A | 8/1990 | Caro | |
| 4,980,826 A | 12/1990 | Wagner | |
| 5,101,353 A | 3/1992 | Lupien et al. | |
| 5,136,501 A | 8/1992 | Silverman et al. | |
| 5,220,501 A | 6/1993 | Lawlor et al. | |
| 5,230,048 A * | 7/1993 | Moy ............................. 395/600 |
| 5,262,942 A | 11/1993 | Earle | |
| 5,285,383 A | 2/1994 | Lindsey et al. | |
| 5,497,317 A * | 3/1996 | Hawkins et al. ................ 705/37 |
| 5,724,523 A * | 3/1998 | Longfield ..................... 395/235 |
| 5,878,337 A * | 3/1999 | Joao et al. ..................... 455/406 |
| 6,347,307 B1 * | 2/2002 | Sandhu et al. .............. 705/36 R |
| 6,477,509 B1 * | 11/2002 | Hammons et al. ............... 705/27 |

FOREIGN PATENT DOCUMENTS

| | | |
|---|---|---|
| GB | 2161003 A | 1/1986 |
| GB | 2210714 A | 12/1988 |

* cited by examiner

*Primary Examiner* — Daniel S Felten
(74) *Attorney, Agent, or Firm* — Schiff Hardin LLP

(57) ABSTRACT

A system for facilitating the processing and settlement of securities trades is provided. The system includes a computer which receives trade execution information indicative of an executed trade by a first trading party and trade order information indicative of an executed trade by a second trading party. The system also includes software for determining block level trade execution information based upon the trade execution information and for determining block level trade order information based upon the trade order information. Further software is provided for comparing the block level trade execution information with the block level trade order information, and for determining that a match exists if the block level trade execution information and the block level trade order information correlate within a set of predefined acceptable trade parameters.

13 Claims, 5 Drawing Sheets

CREATION OF PSEUDO BLOCK TO ASSIST IN SYSTEM FOR FACILITATING TRADE PROCESSING AND TRADE MANAGEMENT

RELATED APPLICATIONS

This application is a continuation-in-part of U.S. patent application Ser. No. 09/504,803, filed Feb. 16, 2000.

FIELD OF THE INVENTION

The present invention relates to a system for facilitating the processing and settlement of securities trades, and more particularly, to a system which automates and streamlines the trade management process thereby reducing the time and effort involved in processing securities trades while increasing the reliability of the trade management process and keeping all parties to the trade informed about the status of the trade while it is being processed.

BACKGROUND OF THE INVENTION

A variety of systems have been developed for automating portions of the securities trading industry. For example, British patent publications GB 2 161 003 A and GB 2 210 714 A are directed to systems for distributing, processing and displaying financial information. Similarly, U.S. Pat. No. 4,949,248 discloses a local area network for shared access of information services or shared control of applications, aimed particularly at trading rooms of securities firms. Other systems include U.S. Pat. Nos. 4,346,442, 4,376,978 and 4,774,663 which are directed to systems for operating and maintaining securities brokerage-cash management accounts, and U.S. Pat. Nos. 4,674,044, 4,823,265 and 5,101,353 which disclose electronic trade execution systems.

None of the above prior art systems, however, are directed to improving the speed and accuracy of communication of the instructions for exchanging the purchase money and the security to settle an executed trade. Thus, none of the prior art systems adequately speeds trade settlement which is accomplished, if at all, by a patchwork of faxes, telexes, and telephone calls among the trading parties.

Systems for automating the settlement of securities trades and the delivery of trade confirmations have been developed to remedy many of the deficiencies of the prior art systems discussed above. These systems, commonly known as Electronic Trade Confirmation ("ETC") systems, reduce the number of tasks required to confirm a trade, and automate most of the remaining tasks, which tasks would have to be performed manually if such an ETC system were not used. Thus, the ETC systems currently in use reduce the time and effort required to settle a securities trade, as compared to the traditional laborious manual method of sequentially exchanging messages by telephone or telex. However, these prior art ETC systems still suffer from certain deficiencies of their own.

U.S. Pat. No. 5,497,317 discloses a system which is based on a series of messages flowing back and forth between institutions, brokers and custodians. This prior art system thus automates many of the tasks which has previously required human intervention, and therefore reduces the time required to settle trades, typically to within three days of the trade date, so-called "T+3". However, "T+3" has been viewed in the securities trading industry as a transitionary phase, not as an end goal. It is anticipated that the Securities and Exchange Commission will soon require settlement to occur within one day of the trade date ("T+1") and possibly even on the same day as the trade date ("T+0"). The above described prior art device works well for T+3 settlement, but may be susceptible in its manual embodiments to settlement failures in a T+1 or T+0 regime due to the large number of time consuming human interactions required for each settlement. One of these human interactions is confirmation of the final settlement terms according to information standards which are either arbitrary or known only to the parties.

What is desired, therefore, is a system for facilitating the processing and settlement of securities trades which reduces the time required for settlement, which reduces the amount of information required to be input by the parties for each trade, which reduces the number of human interactions in the settlement process, which permits the parties to define settlement standards to automate and thereby speed trade settlements, which provides the parties to the settlement with value added data, which is more reliably capable of achieving settlement within less than three days of the trade date, which permits all parties to a trade to view the status of the trade in real-time, and which is capable of calculating a trade's net amount with minimum input by the trading parties.

SUMMARY OF THE INVENTION

Accordingly, it is an object of the present invention to provide a system for facilitating the processing and settlement of securities trades which reduces the time required for settlement.

Another object of the present invention is to provide a system for facilitating the processing and settlement of securities trades having the above characteristics and which reduces the amount of information required to be input by the parties by making this information available to the system without requiring user input.

A further object of the present invention is to provide a system for facilitating the processing and settlement of securities trades having the above characteristics and which reduces the number of human interactions in the settlement process.

Yet another object of the present invention is to provide a system for facilitating the processing and settlement of securities trades having the above characteristics and which permits the parties to define settlement standards to automate and thereby speed trade settlements.

Still another object of the present invention is to provide a system for facilitating the processing and settlement of securities trades having the above characteristics and which provides the parties to the settlement with value added data used to logically alert users of pertinent information which could affect the settlement of the securities trade.

Yet a further object of the present invention is to provide a system for facilitating the processing and settlement of securities trades having the above characteristics and which is more reliably capable of achieving settlement within less than three days of the trade date.

Still a further object of the present invention is to provide a system for facilitating the processing and settlement of securities trades having the above characteristics and which permits all parties to a trade to view the status of the trade in real-time.

Yet another object of the present invention is to provide a system for facilitating the processing and settlement of securities trades having the above characteristics and which is capable of calculating a trade's net amount with minimum input by the trading parties.

These and other objects of the present invention are achieved by provision of a system for facilitating the processing and settlement of securities trades. The system includes a computer which receives trade execution information indicative of an executed trade by a first trading party and trade order information indicative of an executed trade by a second trading party. The system also includes software for determining block level trade execution information based upon the trade execution information and for determining block level trade order information based upon the trade order information. Further software is provided for comparing the block level trade execution information with the block level trade order information, and for determining that a match exists if the block level trade execution information and the block level trade order information correlate within a set of predefined acceptable trade parameters.

If the trade execution information comprises an indication of block level trade execution information, the block level trade execution information is preferably extracted from the trade execution information. However, if the trade execution information comprises an indication of allocation level trade execution information but not an indication of the block level trade execution information, the block level trade execution information is preferably generated based upon the allocation level trade execution information. Similarly, if the trade order information comprises an indication of block level trade order information, the block level trade order information is preferably extracted from the trade order information. However, if the trade order information comprises an indication of allocation level trade order information but not an indication of the block level trade order information, the block level trade order information is preferably generated based upon the allocation level trade order information.

The block level trade execution information and the block level trade order information, if generated, may be permanent, or if block level trade execution information of block level trade order information is later received by the computer, the generated information may be replaced thereby.

Preferably, the trade execution information and the trade order information may be received by the computer in any order and at any time prior to trade settlement.

The invention and its particular features and advantages will become more apparent from the following detailed description considered with reference to the accompanying drawings.

DETAILED DESCRIPTION OF THE INVENTION

Figure 1:
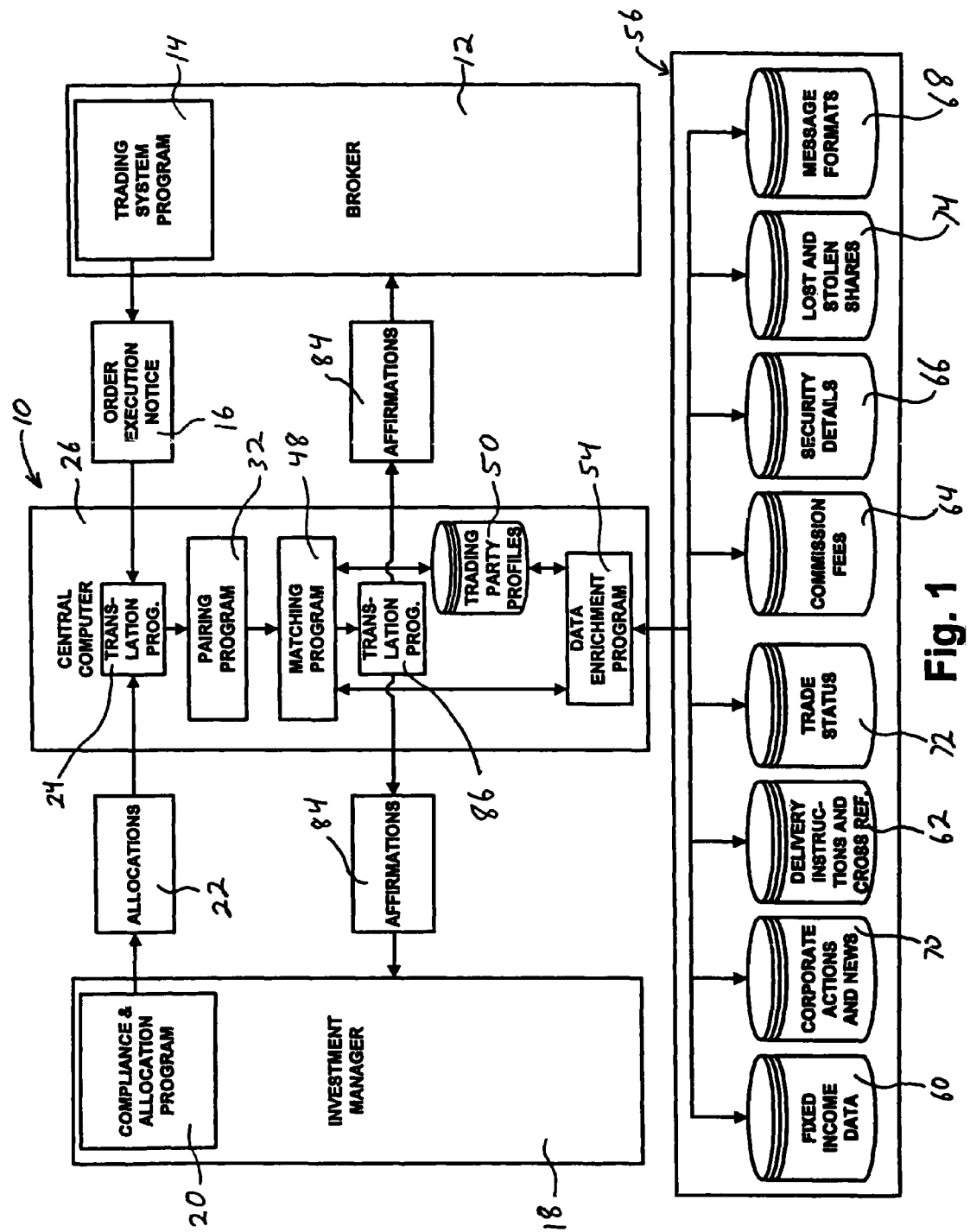
FIG. 1 is a block diagram of a system for facilitating the processing and settlement of securities trades in accordance with the present invention.

Referring first to FIG. 1, a system for facilitating the processing and settlement of securities trades 10 in accordance with the present invention is shown. System 10 receives trade information from two trading parties indicating that a trade has been executed. Typically, one of the trading parties is a broker 12 having a trading system program 14 which supplies trade execution information in the form of an order execution notice 16. The other trading party is typically an investment manager 18 having a compliance and allocation program 20 which supplies trade allocation information in the form of allocations 22. It should be noted, however, that the broker and investment manager situation shown in the Figures and discussed herein is for illustration only, and that the trading parties are not limited to brokers and investment managers. It is envisioned that any individual or institution participating in securities trades may use system 10, so long as two sets of trade information are supplied to the system.

Because there are many trading system programs 14 and compliance and allocation programs 20 which are available, order execution notices 16 and allocations 22 may have any of numerous message formats, (e.g., financial information exchange (FIX), open financial exchange (OFX), etc.) and/or protocols (e.g., systems network architecture (SNA), transmission control protocol/internet protocol (TCP/IP), etc.). For this reason, a translation program 24 executing on the central computer 26 of system 10 is provided. Translation program 24 receives order execution notice 16, extracts trade execution information 28 therefrom, and converts trade execution information 28 into a format which is usable by central computer 26 and the programs executing thereon. Similarly, translation program 24 receives allocations 22, extracts trade allocation information 30 therefrom, and converts trade allocation information 30 into a usable format. Translation program 24 then passes trade execution information 28 and trade allocation information 30 to a pairing program 32 executing on central computer 26. It should be noted that central computer 26 is not limited to a single computer and may comprise a single computer or a system of computers.

Figure 2:
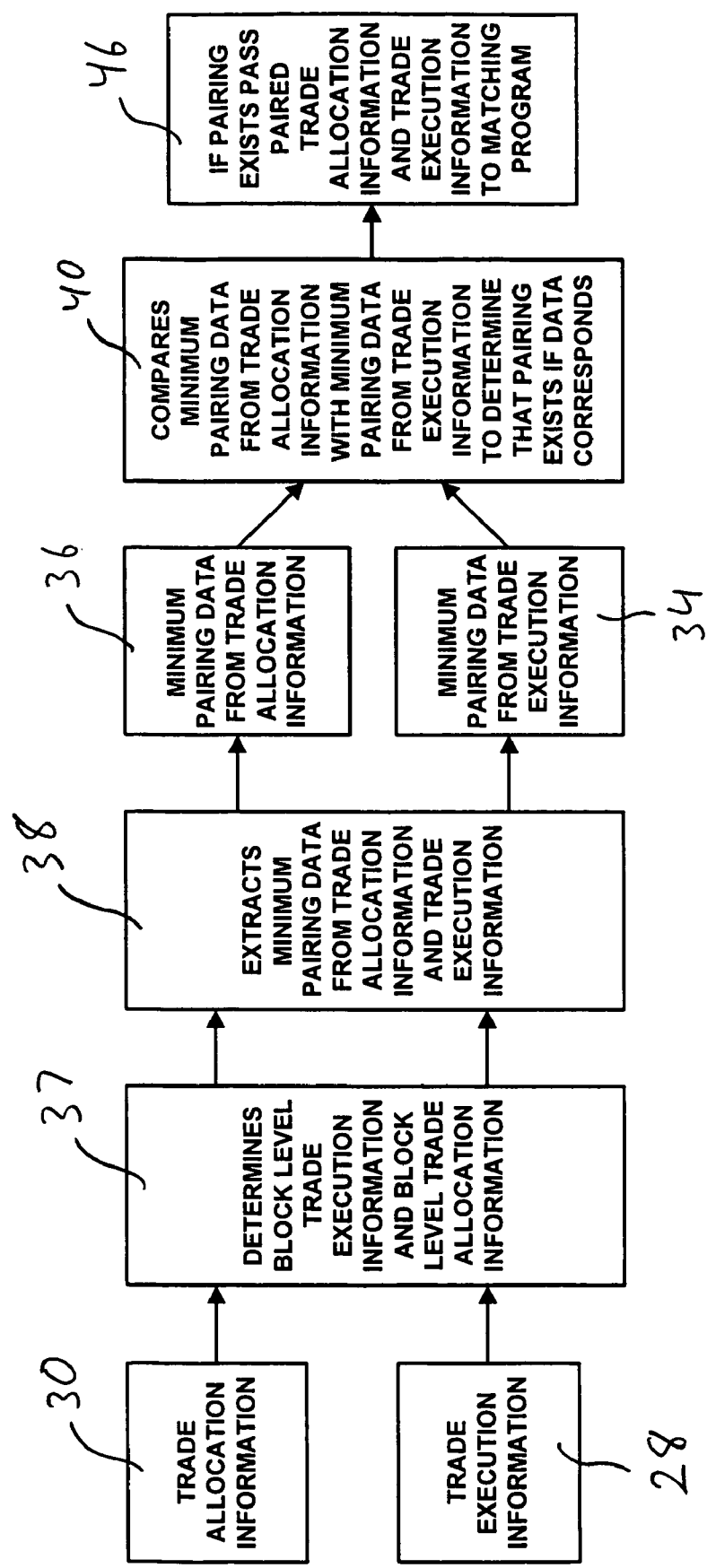
FIG. 2 is a block diagram illustrating the operation of the pairing program of the system for facilitating the processing and settlement of securities trades of FIG. 1.

As best seen in FIG. 2, pairing program 32 receives trade execution information 28 and trade allocation information 30, and extracts from each a set of minimum pairing data 34, 36 (step illustrated as block 38). Minimum pairing data 34, 36 comprise the essential and most basic characteristics of a trade, such as an indicator of whether shares are being bought or sold, the trade date, an identifier of the security, and the number of shares traded. Minimum pairing data 34 from trade execution information 28 and minimum pairing data 36 from trade allocation information 30 are then compared at block 40 and a pairing is found to exist if the minimum pairing data 34, 36 correspond with each other. For example, if trade execution information 28 indicates that 100 shares of IBM were sold on Jan. 1, 1999, and trade allocation information 30 indicates that 100 shares of IBM were bought on Jan. 1, 1999, a pairing would be found to exist. If a pairing is found to exist, paired trade execution information 42 and paired trade allocation information 44 are passed at block 46 to a matching program 48 executing on central computer 26. If a pairing does not occur, system 10 compares trade execution information 28 with other sets of trade allocation information and compares trade allocation information 30 with other sets of trade execution information. If a pairing does not occur after a predetermined time period, the trading party is advised that no pairing has occurred and that the trade has not been settled.

Trade execution information 28 and trade allocation information 30 may be submitted in a number of ways. For example, the information may be submitted at a block level (i.e., at a trade level) with the associated allocation level (i.e., showing the contract detail for the trade) being submitted therewith, or the information may be submitted at the allocation level only. Such may complicate the pairing and matching processes, as system 10 is concerned with matching block level information. Thus, system 10 preferably determines block level trade execution information and block level trade allocation (or order) information based upon trade execution information 28 and trade allocation information 30 respectively (illustrated at step 37). If the block level information is supplied in the trade execution information 28 and trade allocation information 30, the block level information is simply extracted therefrom. However, if the block level information is not supplied in the trade execution information 28 and trade allocation information 30, system 10 creates block level information (called a pseudo block) by summing up the data contained within the allocation level information (i.e., showing the contract detail for the trade).

For example, if an investment manager 18 (i.e., an orderer) submits trade allocation information 30 which includes block level trade information indicating a total of 1000 shares of IBM and allocation level trade information showing orders for 200 shares each for 5 separate funds making up the block level trade, and a broker 12 (i.e., an executor) submits only the allocation level trade information for the 5 separate funds, system 10 creates a pseudo block level trade for broker 12 summing up the allocation level trade information to show a block level trade of 1000 shares. Thus, even though the counterparties are using different methods, the pseudo block created by system 10 allows matching at the block level as well as at the allocation level.

A variation of the pseudo block creation occurs when system 10 receives allocation level information prior to receiving the associated block level information, and it is indicated that the block level information will be sent at a later time. In such a situation, system 10 preferably creates a temporary pseudo block, which is replaces by the actual block when the actual block is received.

The creation of the pseudo block greatly streamlines the settlement process and enables parties who use different communications models to take advantage of a more simplified pairing, matching and reconciliation process. The creation of the pseudo block also facilitates the ability of the system to receive trade data from the counterparties in any order and at any time prior to settlement. Counterparty independence is thus greatly enhanced, and the need for a lockstep approach which requires trade data to be entered in a predetermined sequence is eliminated in even more situations.

Figure 3:
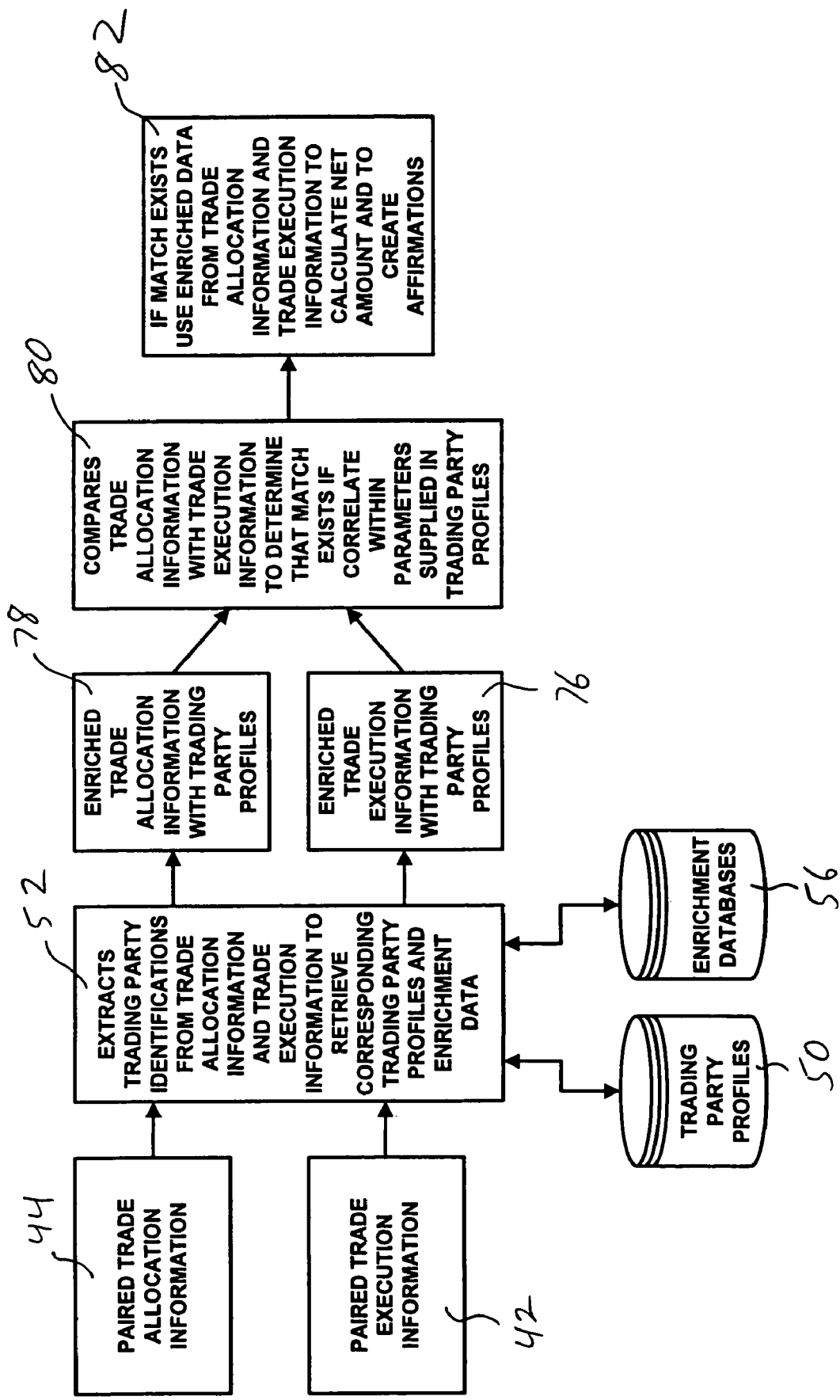
FIG. 3 is a block diagram illustrating the operation of the matching program of the system for facilitating the processing and settlement of securities trades of FIG. 1.

As shown in detail in FIG. 3, paired trade execution information 42 and paired trade allocation information 44 are received by matching program 48. Matching program 48 extracts trading party identifications from paired trade execution information 42 and paired trade allocation information 44, and uses these trading party identifications to query a trading party profiles database 50 to retrieve trading party profiles for each party (step illustrated as block 52). The trading party profiles, which are discussed more fully below, include acceptable trade parameters for each party. The acceptable trade parameters are fully configurable by each trading party for each individual trade and may be based on any of a number of various criteria. Examples of these criteria on which acceptable trade parameters may be specified include, without limitation, counterparty identity, security identity, type of currency, bargain conditions, settlement date, agency, average price, net commission, price, gross consideration, commission amount, commission percentage, commission rate per share, contract gross consideration, commission for the contract, local tax, local fee, other fees, issuing firm charge, net consideration, and accrued interest. The acceptable trade parameters may specify simply whether or not the satisfaction of a criteria is necessary for a match to occur. For example, the trading party may specify that a match can occur only if settlement is to be made in the specific currency identified in its trade execution or trade allocation information. For other criteria which are based on numerical values, the trading party may specify a range, typically expressed either as an absolute value or in a percent tolerance, for which matching will occur. For example, the trading party may specify that for a match to occur, the commission amount must be within plus or minus $100.00 of the commission amount value identified in its trade execution or trade allocation information. Alternately, the trading party may specify that for a match to occur, the commission amount must be within plus or minus 5% of the commission amount value identified in its trade execution or trade allocation information. Of course, the trading party may specify that only a zero tolerance is acceptable, which would require that the criteria correlate exactly for a match to occur. In addition, the trading party may not be concerned about one or more criteria, and may specify that those criteria not be examined to determine if a match exists. It should be noted that preferably, preference is given to the trading party ordering the trade. Therefore, if the data supplied in enriched trade execution information with appended trading party profiles 76 conflicts with the data supplied in enriched trade allocation information with appended trading party profiles 78, the data supplied in enriched trade allocation information with appended trading party profiles 78 would be used. Thus, in the case of a trade between an investment manager and a broker, the preferences of the investment manager would control.

The trading party profiles may be configured to depend on the other party to the paired trade or may be independent of the other trading party. For example, a trading party may configure a first profile having a first set of matching criteria if the other party to the trade is Company A, a second profile having a second set of matching criteria if the other party to the trade is Company B, and a generic default profile having a third set of matching criteria if the other party to the trade is one for which no specific profile has been entered, Company C or Company D for example.

Also at step 52, matching program 48 queries a data enrichment program 54, which in turn queries a plurality of enrichment databases 56 to retrieve data relevant to the trading parties and to the trade. Enrichment databases 56 may provide information which remains relatively constant from one trade to the next, and which would otherwise have to be entered by the trading parties for numerous trades, such as fixed income data 60, delivery instructions and cross references 62, commission fees 64, security details 66 and message formats 68. Traditionally, such information would have to be entered by the trading parties for each trade through "allocations" and "confirmations." Enrichment databases 56 may also provide information which is related to the trade or the security being traded, and which the trading party may be desirous to know about during or after the trade settlement process, such as corporate actions and news 70, trade status 72 and lost and stolen shares 74. Thus, enrichment databases 56 supplement the information supplied by the trading parties with value added data and reduce the amount of information that must be entered by the trading parties for each trade. It should be understood that enrichment databases 56 may or may not be co-located with central computer 26, and may for example comprise databases maintained by independent organizations and accessed by central computer 26.

The enriched trade execution information with appended trading party profiles 76 and the enriched trade allocation information with appended trading party profiles 78 are then compared by matching program 48 at block 80 to determine if a match exists. A match will be found to exist if the data supplied in enriched trade execution information with appended trading party profiles 76 correlates with the data supplied in enriched trade allocation information with appended trading party profiles 78 within the parameters supplied with the trading party profiles for each party. An illustrative example follows. Enriched trade execution information with appended trading party profiles 76 indicates that shares of IBM were bought at $1000.00 US with a $100.00 US commission and that matching criteria are security identification and price within 5%. Enriched trade allocation information with appended trading party profiles 78 indicates that shares of IBM were bought at $1010.00 US with a $98.00 US commission and that matching criteria are security identification and commission amount within 5%. A match would occur in this instance because all matching criteria are satisfied. The security identification matches exactly, the two price amounts are within 5% of each other, and the two commission amounts are within 5% of each other.

When a match is found to exist, matching program at block 82 uses enriched trade execution information with appended trading party profiles 76 and enriched trade allocation information with appended trading party profiles 78 to calculate the net amount of the trade. It should be noted that the calculation of the net amount has been accomplished by using information stored on enrichment databases 56, without requiring the manual entry of this information by the parties through, as has traditionally been done, manual entry of "allocations" and "confirmations." Matching program 82 also uses enriched trade execution information with appended trading party profiles 76 and enriched trade allocation information with appended trading party profiles 78 to generate affirmations 84, which include all information necessary to settle the trade and the value added data retrieved from enrichment databases 56. Because trading parties may use many different computer systems, system 10 includes translation program 86 which translates affirmations 84 into a message format and protocol readable by the trading parties. The format and protocol into which affirmations 84 are translated may have been retrieved, for example, from trading party profiles database 50 or from message formats database 68 during data enrichment.

Figure 4:
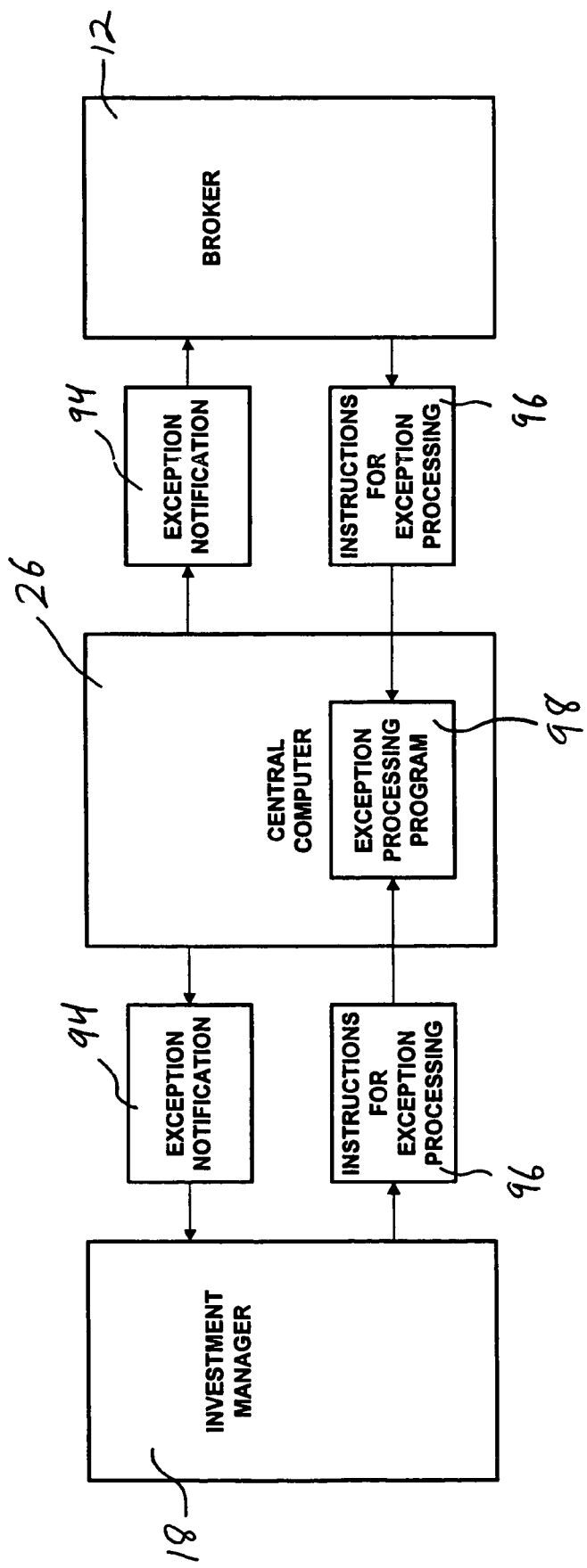
FIG. 4 is a block diagram illustrating of portion of the system for facilitating the processing and settlement of securities trades showing exception processing; and, FIG. 5 is a block diagram of a portion of the system for facilitating the processing and settlement of securities trades of FIG. 1 showing how data management is performed.

Referring now to FIG. 4, if, however, paired trade execution information 42 and paired trade allocation information 44 are found not to match, an exception notification message 94 is generated and transmitted to the trading parties involved. At this point, manual human intervention is required. The trading parties may decide, for example, to reject the trade, to force the match if it was that party's criteria which was not satisfied, or to change some of the information to satisfy the other party's criteria. Instructions for exception processing 96 are the sent by the trading parties to an exception processing program 98 executing on central computer 26. Exception processing program 98 then executes the trading parties' instructions regarding how to process the trade. For example, exception processing program may terminate processing of the trade, continue processing the trade despite the unmatched criteria, of modify paired trade execution information 42 and/or paired trade allocation information 44 to meet the parties' matching criteria and then continue to process the trade, depending on the instructions for exception processing received from the trading parties. It should be understood that this failed match situation is the exception and not the norm, and that in the normal situation where a match occurs, no human intervention is required.

In addition to acceptable trade parameters, the trading party profiles may include additional data relating to each trading party. Such data, which may include information such as data enrichment rules and transaction processing rules, relates to the way in which system 10 handles the settlement process. For example, the data enrichment rules may specify which databases are to be accessed for enrichment with value added data, or may specify a database from which to extract information which was not supplied in the trade information for a particular trade. The trade processing rules may relate to the processes system 10 is to take to settle a trade (e.g., use old message based system for a specific trade instead of matching, or accept information supplied by other trading party for specific criteria) or may relate to the way system 10 is to communicate with the trading party (e.g., want affirmations to be sent to multiple locations). Thus, these data enrichment rules and trade processing rules allow trading parties great flexibility in selecting precisely how system 10 functions with respect to each individual trade and allow the trading parties to seamlessly integrate system 10 into their existing systems. Furthermore, enrichment databases 56 and data enrichment rules provide a platform for connecting to databases of pre-agreed upon information and/or information which is standard in the industry.

As the system receives and processes information, the status and details of the state of the trade is continually monitored and stored on trade status database 72 or in some other form of non-volatile memory. This allows the trading parties to view the status of trades on a real-time basis. This also allows the system to recover the trade related information and continue processing all pending trades in the event of a system failure.

Figure 5:
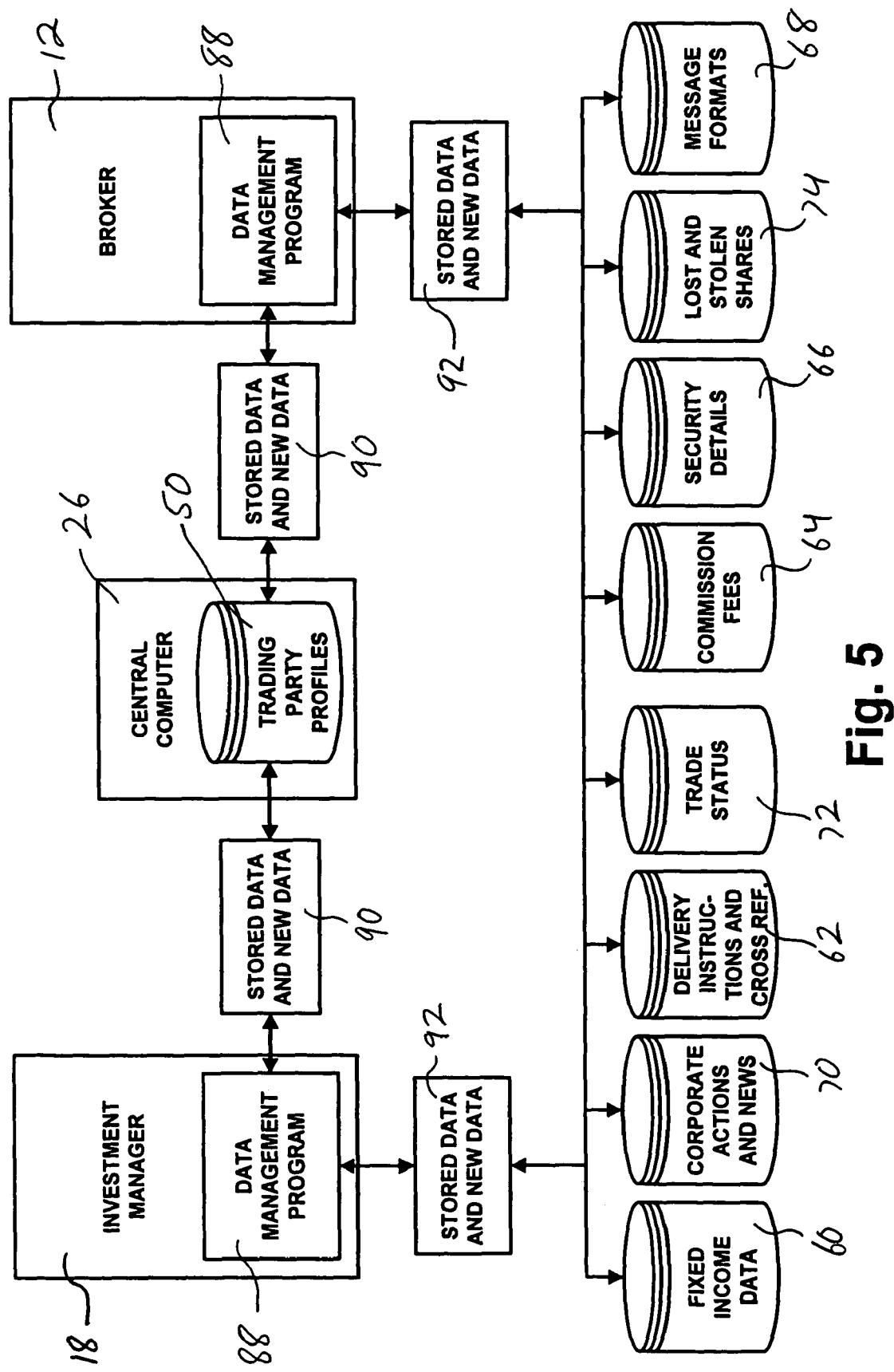

Referring now to FIG. 5, investment manager 18 and broker 12 may access, modify and confirm their trading party profiles stored on trading party profiles database 50 and the enrichment data stored on enrichment databases 56 using a data management program 88. Data management program 88 may be used to retrieve and edit stored data on trading party profiles database 50 and to supplement trading party profiles database 50 with new data (indicated as 90). Similarly, data management program 88 may be used to retrieve and edit stored data on many of enrichment databases 56 and to supplement these enrichment databases 56 with now data (indicated as 92). In addition, enrichment databases may be accessed, modified and confirmed by other authorized parties. For example, corporate actions and news database 70 may be continuously modified by a corporate news service so that database 70 contains up-to-the-minute information. Preferably, when a trading party modifies its profile on trading party profile database 50 or any of enrichment databases 56, any other parties which may be affected my such modification will be notified of the modification by data management program 88.

It should be understood from the above detailed description that all data and message flows between the system and each trading party may be asynchronous. In other words, unlike prior art systems, which rely on a sequential series of messages exchanged back and forth between the system and the trading parties, the present invention provides a system whereby the system communicates with each trading party independently of the other. Such a system greatly increases the speed at which trades are settled. It should also be understood that, while the present invention greatly aids in the settlement of securities transactions, the system does not actually perform trade settlements itself. It should also be understood that the configurability of trading parameters and message formats allows great flexibility in the interface with the trading parties. For example, one party to a trade may configure the system as described above with respect to the preferred embodiment. However, the other party may be accustomed to using a prior art system, for example, the system disclosed in U.S. Pat. No. 5,497,317, hereby incorporated by reference, and desire to receive messages as described therein. Such a user may configure its trading parameters and message formats as described above to emulate such a system.

The present invention, therefore, provides a system for facilitating the processing and settlement of securities trades which reduces the time required for settlement, which reduces the amount of information required to be input by the parties for each trade, which reduces the number of human interactions in the settlement process, which permits the parties to define settlement standards to automate and thereby speed trade settlements, which provides the parties to the settlement with value added data, which is more reliably capable of achieving settlement within less than three days of the trade date, which permits all parties to a trade to view the status of the trade in real-time, and which is capable of calculating a trade's net amount with minimum input by the trading parties.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An apparatus for facilitating the processing and management of a securities trade, comprising:
    a computer;
    trade execution information received by said computer, said trade execution information indicative of an executed trade by a first trading party;
    software executing on said computer for determining block level trade execution information based upon said trade execution information;
    trade order information received by said computer, said trade order information indicative of an ordered trade by a second trading party;
    software executing on said computer for determining block level trade order information based upon said trade order information;
    a set of predefined acceptable trade parameters;
    software executing on said computer for comparing the block level trade execution information with the block level trade order information, and for determining that a match exists if the block level trade execution information and the block level trade order information correlate within said set of predefined acceptable trade parameters,
    wherein said trade execution information comprises an indication of the block level trade execution information, and
    wherein said software executing on said computer for determining block level trade execution information comprises software executing on said computer for extracting the block level trade execution information from said trade execution information.

2. An apparatus for facilitating the processing and management of a securities trade, comprising:
    a computer;
    trade execution information received by said computer, said trade execution information indicative of an executed trade by a first trading party;
    software executing on said computer for determining block level trade execution information based upon said trade execution information;
    trade order information received by said computer, said trade order information indicative of an ordered trade by a second trading party;
    software executing on said computer for determining block level trade order information based upon said trade order information;
    a set of predefined acceptable trade parameters;
    software executing on said computer for comparing the block level trade execution information with the block level trade order information, and for determining that a match exists if the block level trade execution information and the block level trade order information correlate within said set of predefined acceptable trade parameters,
    wherein said trade execution information comprises an indication of allocation level trade execution information but not an indication of the block level trade execution information, and
    wherein said software executing on said computer for determining block level trade execution information comprises software executing on said computer for generating block level trade execution information based upon the allocation level trade execution information.

3. The apparatus of claim 2, wherein the generated block level trade execution information is replaced by block level trade execution information later received by said computer.

4. An apparatus for facilitating the processing and management of a securities trade, comprising:
    a computer;
    trade execution information received by said computer, said trade execution information indicative of an executed trade by a first trading party;
    software executing on said computer for determining block level trade execution information based upon said trade execution information;
    trade order information received by said computer, said trade order information indicative of an ordered trade by a second trading party;
    software executing on said computer for determining block level trade order information based upon said trade order information;
    a set of predefined acceptable trade parameters;
    software executing on said computer for comparing the block level trade execution information with the block level trade order information, and for determining that a match exists if the block level trade execution information and the block level trade order information correlate within said set of predefined acceptable trade parameters,
    wherein said trade order information comprises an indication of the block level trade order information, and
    wherein said software executing on said computer for determining block level trade order information comprises software executing on said computer for extracting the block level trade order information from said trade order information.

5. An apparatus for facilitating the processing and management of a securities trade, comprising:
    a computer;
    trade execution information received by said computer, said trade execution information indicative of an executed trade by a first trading party;
    software executing on said computer for determining block level trade execution information based upon said trade execution information;

trade order information received by said computer, said trade order information indicative of an ordered trade by a second trading party;

software executing on said computer for determining block level trade order information based upon said trade order information;

a set of predefined acceptable trade parameters;

software executing on said computer for comparing the block level trade execution information with the block level trade order information, and for determining that a match exists if the block level trade execution information and the block level trade order information correlate within said set of predefined acceptable trade parameters, wherein said trade order information comprises an indication of allocation level trade order information but not an indication of the block level trade order information, and wherein said software executing on said computer for determining block level trade order information comprises software executing on said computer for generating block level trade order information based upon the allocation level trade order information.

6. The apparatus of claim 5, wherein the generated block level trade order information is replaced by block level trade order information later received by said computer.

7. An apparatus for facilitating the processing and management of a securities trade, comprising:

a computer;

trade execution information received by said computer, said trade execution information indicative of an executed trade by a first trading party;

software executing on said computer for determining block level trade execution information based upon said trade execution information;

trade order information received by said computer, said trade order information indicative of an ordered trade by a second trading party;

software executing on said computer for determining block level trade order information based upon said trade order information;

a set of predefined acceptable trade parameters; and software executing on said computer for comparing the block level trade execution information with the block level trade order information, and for determining that a match exists if the block level trade execution information and the block level trade order information correlate within said set of predefined acceptable trade parameters, wherein said trade execution information and said trade order information may be received by said computer in any order.

8. An apparatus for facilitating the processing and management of a securities trade, comprising:

a computer;

trade execution information received by said computer, said trade execution information indicative of an executed trade by a first trading party;

software executing on said computer for determining block level trade execution information based upon said trade execution information;

trade order information received by said computer, said trade order information indicative of an ordered trade by a second trading party;

software executing on said computer for determining block level trade order information based upon said trade order information;

a set of predefined acceptable trade parameters; and software executing on said computer for comparing the block level trade execution information with the block level trade order information, and for determining that a match exists if the block level trade execution information and the block level trade order information correlate within said set of predefined acceptable trade parameters, wherein said trade execution information and said trade order information may be received by said computer at any time prior to trade settlement.

9. An apparatus for facilitating the processing and management of a securities trade comprising:

a computer;

trade execution information received by said computer, said trade execution information indicative of an executed trade by a first trading party;

software executing on said computer for, if said trade execution information comprises an indication of block level trade execution information, extracting the block level trade execution information from said trade execution information and for, if said trade execution information comprises an indication of allocation level trade execution information but not an indication of the block level trade execution information, generating block level trade execution information based upon the allocation level trade execution information;

trade order information received by said computer, said trade order information indicative of an ordered trade by a second trading party;

software executing on said computer for, if said trade order information comprises an indication of block level trade order information, extracting the block level trade order information from said trade order information and for, if said trade order information comprises an indication of allocation level trade order information but not an indication of the block level trade order information, generating block level trade order information based upon the allocation level trade order information;

a set of predefined acceptable trade parameters; and software executing on said computer for comparing the block level trade execution information with the block level trade order information, and for determining that a match exists if the block level trade execution information and the block level trade order information correlate within said set of predefined acceptable trade parameters.

10. The apparatus of claim 9 wherein, if the block level trade execution information has been generated, the generated block level trade execution information is replaced by block level trade execution information later received by said computer.

11. The apparatus of claim 9 wherein, if the block level trade order information has been generated, the generated block level trade order information is replaced by block level trade order information later received by said computer.

12. The apparatus of claim 9 wherein said trade execution information and said trade order information may be received by said computer in any order.

13. The apparatus of claim 9 wherein said trade execution information and said trade order information may be received by said computer at any time prior to trade settlement.

* * * * *